April 21, 1942.　　　C. E. BENNETT　　　2,280,183
JOINT FOR NON-METALLIC PIPES AND GASKETS THEREFOR
Filed Feb. 11, 1941
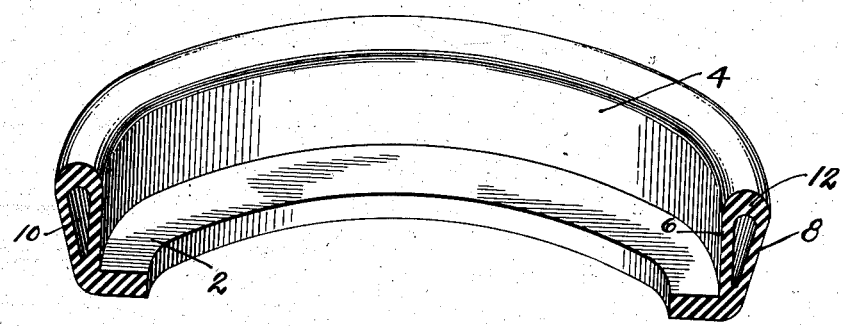
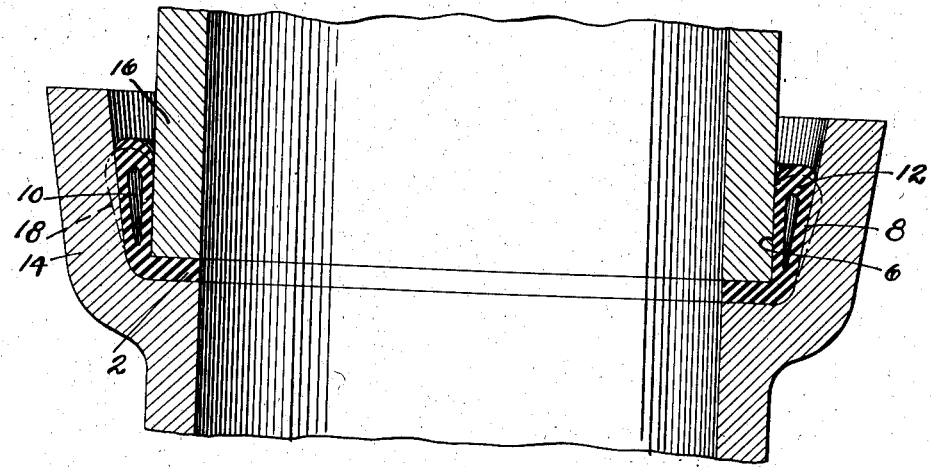
INVENTOR
Charles E. Bennett
BY
Kiddle, Bechtel and Montgomery
ATTORNEYS.

Patented Apr. 21, 1942

2,280,183

UNITED STATES PATENT OFFICE 2,280,183

JOINT FOR NONMETALLIC PIPES AND GASKETS THEREFOR

Charles E. Bennett, Ridgewood, N. J.

Application February 11, 1941, Serial No. 378,343

1 Claim. (Cl. 285—163)

This invention is directed to an improvement in pipe joints with particular reference to joints for nonmetallic pipe, of the type comprising a plain faced cylindrical spigot and a cooperating bell.

One of the objects of my invention is to provide such a joint which will be tight and yet will permit of a certain amount of relative movement between the two sections of pipe making up the joint without breaking the joint seal and without breaking the pipe. By making a joint which will be fluid-tight at all times, I not only eliminate escape from the pipe line of any fluid which may be in the line, but I also eliminate the entry of fluid such as surface water, for example, to the line. This is of great importance, where surface water may be present in considerable amount, inasmuch as in the case of sewer pipe, for example, installed in low ground the entry of this water to the line may be so great as to overtax the treating plant. Actually this has happened in the case of ordinary joints in some communities where the sewage disposal plant has been designed for a certain capacity based upon expected conditions; the entry of surface water into the sewage lines through leaky joints has necessitated the expense of enlarging the disposal plant.

Another difficulty experienced in this art with joints which do not remain fluid-tight after installation is the tendency for tree roots to work through the joint to the interior of the line, eventually resulting in complete clogging of the line and necessitating taking up the line.

In the type of joint to which my invention relates, installation, handling and operating conditions must be taken into account. For example, it would seen to be a simple and satisfactory matter simply to place the bell and spigot together and then to fill the space between with cement. This, however, is not as satisfactory as would appear. In the first place, it is not a simple matter to make up the joint without getting the cement into the line itself. Then again, cement shrinks as it sets up, so that a tight joint is not assured, and owing to the brittleness of pipe such as cement and clay tile it is not feasible to pack the cement in sufficiently tight to make up for this shrinkage. Finally, such a joint has practically no flexibility so that in installing the pipe sections after the joint has been made up the joint may be loosened so that it will leak. After installing, excessive strains such as backfilling, vibrations due to traffic conditions and settling, etc. may be imposed on the joint sufficient to break the seal.

In designing the joint of this invention I have had all of these drawbacks in mind and have invented a joint which is easy to make up, certain to be fluid-tight, flexible and not affected by handling, installing, backfilling, traffic conditions and so forth. At the same time I have, of course, so designed the joint that breakage of the pipe itself in which the joint is installed is reduced to a minimum, even though the line be deflected at the joint.

More specifically the present invention comprises a flexible gasket of vulcanized rubber or rubber compound which is of special shape and construction whereby when the same is secured in place between the bell and spigot of two adjacent pipe ends, the gasket will give or yield in all directions sufficiently to permit misalignment of the pipe sections without breaking the seal provided by the gasket and without breaking the pipe itself.

In the accompanying drawing:

Fig. 1 is a sectional view of my improved gasket; and

Fig. 2 is a sectional view of the made-up joint employing the gasket of Fig. 1 as the sealing medium.

Referring to the drawing in detail: It will be seen that my invention provides a gasket of elastic material such as vulcanized rubber or rubber compound, this gasket comprising an inwardly extending, bottom annular flange 2 and a hollow rim 4 upstanding from the same. This hollow rim is wedge-shaped in cross section, the outer side wall 8 sloping inwardly toward the flange 2. The hollow of the gasket is designated 10 and its cross section is of substantially the same shape as the cross section of the rim, so that the thickness of the walls 6 and 8 of the gasket at each side of the hollow 10 is the same. The upper edge 12 of the gasket rim, however, is substantially thicker than the walls 6 and 8 as plainly indicated in Fig. 1 which shows the gasket in repose, that is, before it has been installed in a joint.

Referring now more particularly to Fig. 2 of the drawing: 14 designates the bell and 16 the spigot of the joint of a clay tile or cement pipe. As is customary in the pipe industry, the bell 14 tapers outwardly, while the spigot is straight sided, and in the finished joint the spigot is inserted into the bell.

In making up the joint, the gasket is bonded to the end of the spigot, with any suitable cement, or may be vulcanized to the spigot, the wall 6 of the gasket lying along the side of the spigot, the bottom annular flange 2 extending across the end of the spigot to which it is bonded. After a suitable bonding material has been applied to the inner face of the bell 14 or to the outer surface of the gasket, or both, the spigot and gasket are forced into the bell until they bottom or seat therein.

In forcing the two parts of the joint together, the gasket is dragged into the space between the spigot and bell and distorted or compressed as shown in Fig. 2. The broken lines 18 of this figure show the shape of the gasket before it has been dragged home. It will be seen from a comparison of the broken line outline with the full lines on the drawing that when the joint parts are fully "home" the rim 4 of the gasket has been uniformly squeezed down from its initial width or thickness. This squeezing down is permitted by reason of the provision of the hollow 10, and its purpose is twofold, to wit, to take up the inequalities in the joint due to poor workmanship in making the bell and spigot, and to provide a seal with the spigot and bell against the passage of a fluid past the gasket in either direction, that is, into the pipe line or out of the pipe line. This brings me to the purpose or reason for thickening the upper edge 12 of the rim 4, that is to say, the reason for providing a thickness of material from the top of the hollow 10 to the upper surface of the rim 4 greater than that of the thickness of the walls 6 and 8 at the opposite sides of the hollow. The purpose of this construction is to provide considerable resistance to the squeezing down of the side walls of the rim just referred to above, so as to ensure a real tight wedging action of the gasket between the spigot and bell of the joint, this thickened portion of the gasket being strongly resistant to a force tending to bow or arch the thickened portion outwardly of the joint as the spigot and gasket are forced into the bell, this force being transmitted to the side walls of the gasket, with the net result that one obtains the desired wedging action of the gasket between the spigot and bell with the minimum tendency of slippage of the gasket outwardly from between the spigot and bell.

I have found also that this thickened portion 12 performs another important function in that when the two sections of pipe are moved relatively to each other, as, for example, should the joint sag for any reason due to handling, backfilling or traffic conditions, for instance, the thickened portion 12 of the gasket acts as more or less of a bearing for the pipe sections to roll on while the gasket itself has sufficient resiliency due to its hollow wall or rims 4 to permit of this movement without rupturing the pipe sections and without breaking the joint seal.

If desired, when initially installing the gasket the surfaces of the same which are to be secured to the pipe sections may be slightly roughened to increase the adhesion of the cement or other material employed.

It is to be understood that changes may be made in the details of construction hereinabove described without departing from the spirit and scope of the invention.

What I claim is:

In a floating pipe joint comprising inner and outer tile pipe members of the bell and spigot type and defining between them an annular space, a resilient gasket for sealing said annular space while permitting deflection of adjacent pipe sections without fracturing the bell and without breaking the seal provided by the gasket, said gasket being provided with an annular flange adapted to be interposed between the end of the spigot and the bottom of the bell, a hollow integral rim for the flange adapted to extend into the said annular space between the bell and spigot, the said rim being of the same general shape as the said annular space but larger in size so as to require the flange when in place to be under some compression thereby to take up any irregularities in the walls of said annular space and provide for bonding the rim to the spigot and bell throughout both the inner and outer faces of the rim, the edge of the gasket rim axially of the gasket being of sufficiently increased thickness as compared with the rim side walls as to provide a bearing upon which the pipe sections can roll in flexing the joint, and to provide substantial increased resistance to the squeezing down of the rim side walls to increase the wedging action of the gasket between the bell and spigot.

CHARLES E. BENNETT.